Oct. 17, 1933.     A. A. WARNER     1,931,451
TOASTER
Filed Aug. 8, 1929     2 Sheets-Sheet 1

Inventor
Alonzo A. Warner
By W. Clay Lindsey
his Attorney

Oct. 17, 1933.                A. A. WARNER                1,931,451
                                 TOASTER
                            Filed Aug. 8, 1929          2 Sheets-Sheet 2
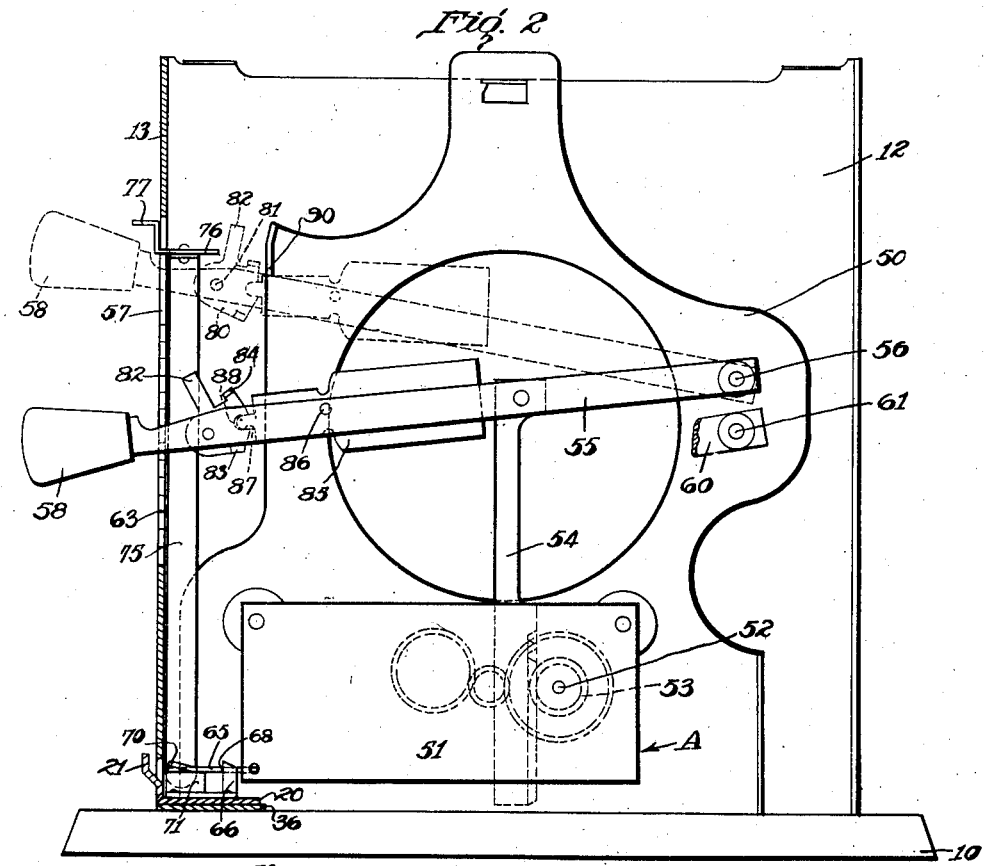
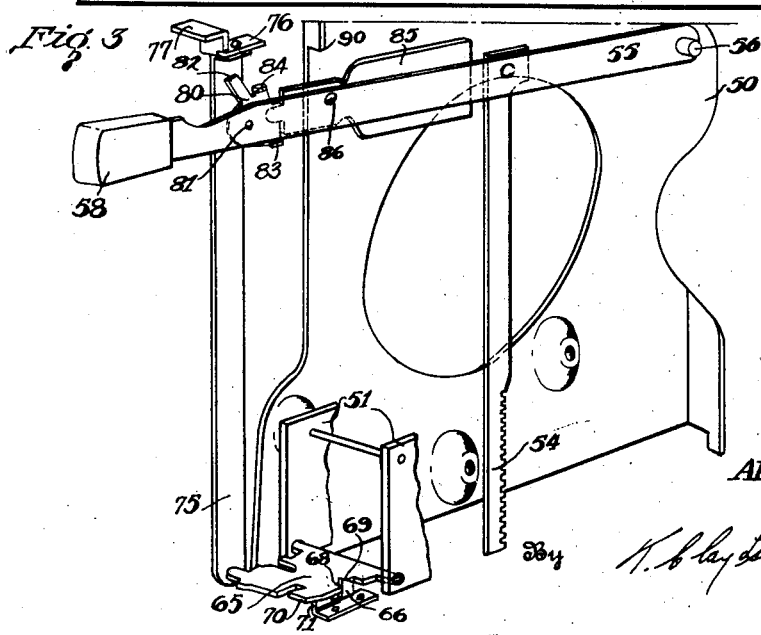
Inventor
Alonzo A. Warner Patented Oct. 17, 1933

1,931,451

UNITED STATES PATENT OFFICE 1,931,451

TOASTER

Alonzo A. Warner, New Britain, Conn., assignor to Landers, Frary & Clark, New Britain, Conn., a corporation of Connecticut Application August 8, 1929. Serial No. 384,329

7 Claims. (Cl. 161—16)

The present invention relates to toasters, and has particular reference to toasters of the type disclosed in my co-pending application Serial No. 274,017, filed April 30th, 1928.

The aim of the present invention is to provide a toaster of the character described having various features of novelty and advantage.

More particularly, an aim of the invention is to provide a toaster of this sort having certain improvements which make for simplicity in construction and economy in manufacture.

A more specific aim of the invention is to provide an improved tripping arrangement through which the timing mechanism releases the toast carrier when the toasting operation has been completed. My improved tripping arrangement is very simple in construction and reliable in operation.

Another specific aim of the invention is to provide an improved toast carrier.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one of the many embodiments which the present invention may take:

Fig. 2 is an interior view of one side of the casing and shows the means through which the carrier is tripped; and Fig. 3 is a perspective view of the elements through which the timing mechanism trips the carrier.

Figure 1:
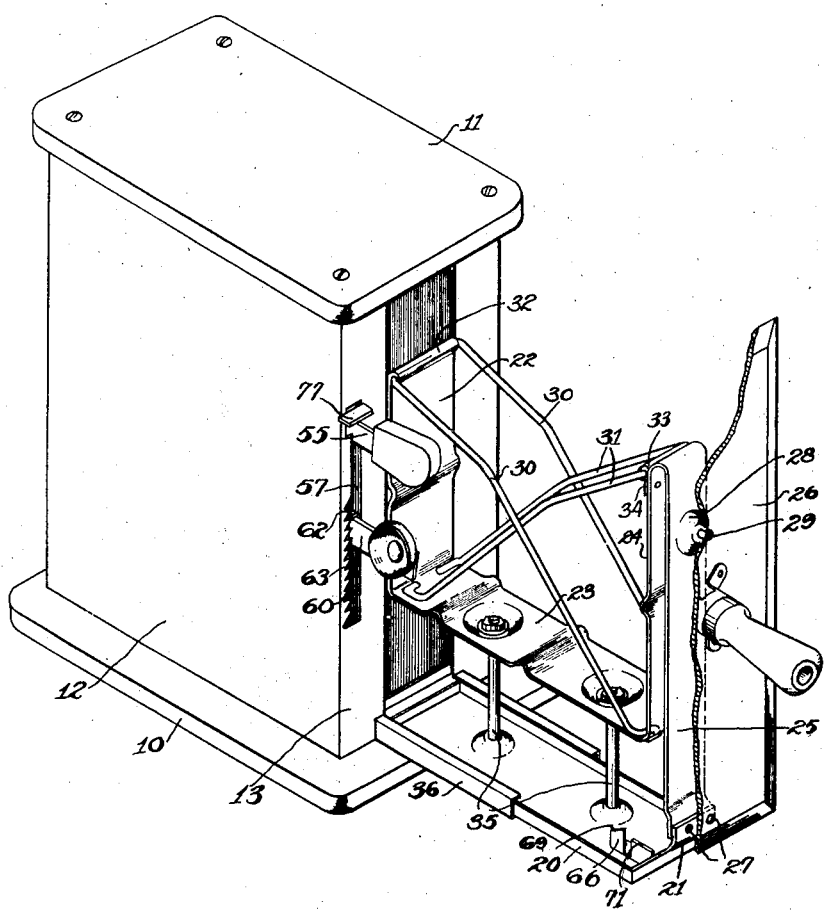
Figure 1 is a perspective view of my improved toaster with the carrier thereof shown in withdrawn or "out" position.

Referring to the drawings in detail, the toaster is shown as having a heat retaining oven or casing which is similar to that disclosed in my said application. This casing has a base 10, a top 11, side walls 12, and a front wall 13 provided with a vertical opening or doorway through which the carrier is adapted to slide. The internal construction of the casing is not shown in the accompanying drawings, it being understood that it may be similar to that shown in my said application. It may be said, however, that the casing is internally divided into a heating compartment and a chamber therebeneath. The heating compartment has two spaced apart electrical heating elements between which the bread in the carrier is held. Between the side walls of the heating compartment and the side walls of the casing are insulating spaces.

The toaster is provided with a vertical toast carrier mounted for movement to and from position between the heating elements and through the opening in the front of the casing. In the present illustrative disclosure, this carrier has a sheet metal base 20, the edges of which are turned upwardly so as to form a crumb tray. The front edge of the crumb tray has an upstanding lug or projection 21. The toast holder proper is formed of a strip of metal which is bent to provide a rear upstanding wall 22, a bottom 23 and a front wall 24. Formed integrally with the toast holder and extending downwardly from the upper end of the front wall 24 and in parallelism with that wall is a leg or attaching portion 25, the lower end of which engages against the rear face of the lug 21. The numeral 26 designates a closure plate which is adapted to close the front opening in the casing when the carrier is in toasting position. The lower ends of the attaching portion 25 and the closure plate 26 are secured to the lug 21 by rivets 27. Adjacent the upper end of the attaching portion there is a boss 28 against which the closure plate engages, and the closure plate is secured to this boss by a rivet 29. The toast holder also has suitable sides formed by guard wires 30 and 31. These guard wires are diagonally disposed cross one another. Each pair of guard wires is preferably formed by bending a length of wire into U or hairpin form. The cross portion of the hairpin, having the arms 30, is anchored in place by curling the upper end of the rear wall 22, as at 32, about said cross portion. The forward ends of the arms 30 are angularly bent and extend through holes in the forward end of the bottom 23. The cross portion of the hairpin, having the arms 31, is anchored in a bead 33 of a strip 34 secured to the upper end of the front wall 24. The rear ends of the arms 31 are anchored to the toast holder by extending those arms through openings in the rear end of the bottom 23 and turning over the ends of the arms. The holder is supported in spaced vertical relation with respect to the base or tray 20 by posts 35. The base 20 is mounted for sliding movement in an extension slide 36. This extension slide is similar in construction and arrangement to that disclosed in my said application. It is normally urged outwardly by a spring which is not shown.

It will be observed, from the foregoing description, that my improved toast carrier is very simple in construction and economical in manufacture. The parts may be cheaply and simply made and readily assembled.

Referring now to the mechanism for releasing the toast carrier at a predetermined time, 50 designates a supporting plate generally similar to the supporting plate shown in my said application. This plate is located along the inside of the side wall 12 of the casing and carrier the timing mechanism which is designated generally by the letter A. This timing mechanism may be of any suitable sort and, therefore, it is shown more or less diagrammatically. It has a pair of side places 51 in which is journalled a spring-actuated and escapement-controlled shaft 52 provided with a pinion or gear 53. Meshing with this pinion are the teeth on a rack bar 54 pivoted at its upper end to an operating member or lever 55 which, in turn, is pivoted, as at 56, to the supporting plate. The operating lever extends through a vertical slot 57 in the front wall of the casing and has a handle or knob 58. The numeral 60 designates a setting bar or arm pivoted to the supporting plate 50, as at 61, and extending beneath the lever 55 and through the slot 57. The forward end of the setting bar has an offset portion 62 which forms a tooth adapted to selectively cooperate with teeth 63 on one of the side edges of the slot 57. Pivoted to the forward lower corners of the plates 51 is a latch plate 65 which cooperates with a catch 66 secured to the crumb tray so as to hold the toast carrier within the casing during the toasting operation. The latch and catch are generally similar to those disclosed in my said application. The catch is adapted to engage against an abutment 68 on the latch when the latter is in latching position. The upper edge of the catch 66 is inclined downwardly and rearwardly, as at 69, and the latch has an upwardly and forwardly inclined lug 70 so that, when the carrier is moved from the "out" position shown in Fig. 1 to the "in" position shown in Figs. 2 and 3, the ear 70, upon engaging the inclined surface 69, will ride over the catch and then the latch will drop down in front of the catch. The catch has a rest 71 for holding the latch in the position shown in Figs. 2 and 3. Connected to the latch plate 65 is a trip rod 75 which extends upwardly along the side wall 12 immediately behind the front wall of the casing. The trip rod has, at its forward end, a rearwardly extending tail or projection 76 and a forwardly extending thumb piece 77. The latter extends through the upper end of the slot 57 in the front of the casing.

The means so far described for effecting automatic operation of the toaster are generally similar to those disclosed in my said application. Reference will now be had to the improvements of the present invention. In accordance with the present invention, an improved arrangement is provided whereby the latch plate is moved out of latching position to release the carrier when the lever 55 (under the influence of the timing mechanism) approaches its uppermost position, and the latch may then immediately and automatically move back to its latching position so that, when the carrier is again pushed in, it will be latched in place although the lever 55 may be in its raised position. This arrangement includes a trip member 80, preferably pivoted, as at 81, to the lever 55. This trip 80 has a finger or projection 82 which is adapted to engage the shoulder provided by the tail 76 to raise the trip rod and the latch 65. The trip 80 has a lower lug 83 adapted to engage against the lower edge of the lever 55 so as to limit turning movement of the trip in one direction. If desired, the trip may also have a lug 84 adapted to engage the top edge of the lever 55 so as to limit the extent to which the trip may turn in the other direction. By preference, the trip is held in actuating position by a gravity member which, in the present instance, is in the form of a lever 85 pivoted, as at 86, to the lever 55. The forward end of this lever 85 has a tongue 87 adapted to engage in a notch 88 in the rear edge of the trip 80. The rear end of the lever 85 is of increased weight so that the normal tendency of this lever is to assume the position shown by full lines in Fig. 2 and, in which position, it holds the trip in actuating position with the lower lug 83 engaging against the lower edge of the lever 55. For the purposes of moving the trip out of engagement with the tail 76 after the latch has been raised and of limiting upward movement of the lever 55, there is provided, preferably on the plate 50, a shoulder, stop or abutment 90 against which the gravity lever 85 is adapted to engage.

The operation of my improved toaster is briefly as follows: The piece of bread to be toasted is positioned in the toast holder and then the carrier is moved from the position shown in Fig. 1 to that shown in Fig. 2. The latch plate 65 is normally in the latching position in Figs. 2 and 3 so that, when the carrier is moved in, the latch will ride up the inclined surface 69 and then drop down so that the shoulder 68 is in front of the catch 66. The operating lever 55 may now be moved down until it engages the setting arm 60 which has been previously adjusted. Preferably, when the lever 55 is moved down, the spring of the timing mechanism is wound up. Upon release of the lever 55, the timing mechanism through the rack bar 54, will slowly move the lever 55 upwardly, and, when this lever approaches the limit of its upward travel, the finger 82 of the trip will engage the tail 76 of the rod 75, thereby lifting this rod and the latch so as to release the toast carrier which, under the spring (not shown) connected to the extension slide, will be moved to the "out" position shown in Fig. 1. After the latching means has been tripped, the lever 55 continues to move upwardly, thereby bringing the forward end of the gravity lever 85 into engagement with the abutment 90 so that the lever 85 and the trip 80 will rock from the positions shown in full lines Fig. 2 to the positions shown in dotted lines of the figure; that is to say, the projection 82 of the trip is moved rearwardly of the tail 76. The trip rod and latch plate are now free to move downward so that the latch plate assumes its latching position.

It will be observed that my improved mechanism is very simple in construction and arrangement and it is very reliable and efficient in operation. One particular advantage of the arrangement described is that precision in manufacture of the parts is unnecessary. Sufficient tolerances may be allowed to effect economy in manufacture and to allow for expansion and contraction of the parts under heat changes without effecting the reliability of the mechanism or its uniformity in operation.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A toaster having a casing, a toast carrier mounted for sliding movement into and out of said casing, latching mechanism for locking said carrier in toasting position, timing mechanism, an operating member actuated by said timing mechanism, a trip member movably carried by said operating member and adapted to disengage said latching mechanism to release said carrier when said operating member approaches the limit of its movement under the influence of said timing mechanism, means normally tending to move said trip member into tripping position, and a fixed abutment for moving said trip member out of tripping position after said latching mechanism has been disengaged thereby.

2. A toaster having a casing, a toast carrier mounted for sliding movement into and out of said casing, latching mechanism for locking said carrier in toasting position and including a catch on said carrier and a cooperating latch plate, timing mechanism, an operating member actuated thereby, a trip member carried by and movable with respect to said operating member and adapted to move said latch plate out of latching position when said operating member approaches the limit of its movement under the influence of said timing mechanism, and a fixed abutment for moving said trip member out of tripping position after it has disengaged the latching mechanism and for limiting the extent of movement of said operating member.

3. A toaster having a casing, a toast carrier mounted for sliding movement into and out of said casing, latching mechanism for locking said carrier in toasting position within said casing, timing mechanism, an operating member actuated by said timing mechanism, a trip pivoted to said operating member and adapted to disengage said latching mechanism when said operating member approaches the limit of its movement under the influence of said timing mechanism, means for normally urging said trip into tripping position, and means for moving said trip out of tripping position after the latching mechanism has been disengaged.

4. A toaster having a casing, a toast carrier mounted for sliding movement into and out of said casing, latching mechanism for locking said carrier in toasting position within said casing and including a catch on said carrier and a cooperating latch plate, timing mechanism, an operating member actuated by said timing mechanism, a trip member carried by said operating member and adapted to move said latch plate out of latching position when said operating member approaches the limit of its movement under the influence of said timing mechanism, gravity means for normally urging said trip member into tripping position, and means for moving said trip member out of tripping position after it has disengaged said latching mechanism.

5. A toaster having a casing, a toast carrier mounted for sliding movement into and out of said casing, latching mechanism for locking said carrier in toasting position, timing mechanism, an operating member actuated by said timing mechanism, a trip member pivoted to said operating member for disengaging said latching mechanism when said operating member approaches the limit of its movement under the influence of said timing mechanism, a weighted lever pivoted to said operating member and operatively connected to said trip member to normally urge the same into tripping position, and an abutment against which said lever is adapted to engage after the latching mechanism is disengaged to move said trip member out of tripping position.

6. A toaster having a casing, a toast carrier mounted for movement into and out of said casing, a pivoted latch plate, a catch on said carrier adapted to cooperate with said latch plate to lock the carrier in operative position, timing mechanism, an operating member actuated by said timing mechanism, a trip rod connected to said latch plate, a trip pivoted to said operative member and having a portion adapted to engage said trip rod and to disengage the latch plate when said operating member approaches the limit of its movement under the influence of said timing mechanism, means for normally urging said trip into tripping position, and means for moving said trip out of tripping position after the latching plate is disengaged and for limiting the extent of movement of said operating member.

7. A toaster having a casing, a toast carrier mounted for movement into and out of said casing, a catch on said carrier, a pivoted latch plate adapted to cooperate with said catch to hold the carrier in operative position, timing mechanism, an operating lever actuated by said timing mechanism, a trip rod connected to said latch plate, a trip member pivoted to said lever and adapted to engage said trip rod to release said latch plate from said catch when the lever approaches the limit of its movement under the influence of said timing mechanism, a gravity lever pivoted to said operating lever and normally urging said trip into tripping position, and a fixed abutment adapted to engage said gravity lever to move said trip out of tripping position after the latch plate has been disengaged.

ALONZO A. WARNER.